(12) United States Patent
Biggel et al.

(10) Patent No.: US 8,596,446 B2
(45) Date of Patent: Dec. 3, 2013

(54) METHOD AND DEVICE FOR PRODUCING FORMATTED PACKAGINGS

(75) Inventors: Andreas Biggel, Hergatz (DE); Stefan Hofer, Isny (DE)

(73) Assignee: Hochland SE, Heimenkirch (DE)

( * ) Notice: Subject to any disclaimer, the term of this patent is extended or adjusted under 35 U.S.C. 154(b) by 208 days.

(21) Appl. No.: 13/203,553

(22) PCT Filed: Mar. 5, 2010

(86) PCT No.: PCT/EP2010/052868
§ 371 (c)(1),
(2), (4) Date: Aug. 26, 2011

(87) PCT Pub. No.: WO2010/102963
PCT Pub. Date: Sep. 16, 2010

(65) Prior Publication Data
US 2012/0014774 A1    Jan. 19, 2012

(30) Foreign Application Priority Data

Mar. 4, 2009 (DE) .......................... 10 2009 019 462
Mar. 10, 2009 (DE) .......................... 10 2009 011 936

(51) Int. Cl.
*B65G 47/26* (2006.01)

(52) U.S. Cl.
USPC .................... 198/419.2; 198/575; 198/461.3; 198/462.3; 198/594; 198/812

(58) Field of Classification Search
USPC .......... 198/419.2, 418.7, 459.8, 460.1, 460.2, 198/461.1, 462.1, 410, 411, 412, 418.5, 198/431, 394, 406, 461.3, 461.2, 594, 812, 198/575; 414/789.2
See application file for complete search history.

(56) References Cited

U.S. PATENT DOCUMENTS 4,120,393 A    10/1978 Motooka et al.
4,960,198 A    10/1990 Hogenkamp
(Continued)

FOREIGN PATENT DOCUMENTS

DE    3546248 A1    7/1987
DE    3819348 C1    9/1989
(Continued)

OTHER PUBLICATIONS

Canadian office action dated May 24, 2013 for Canadian Patent Application No. 2,753,783.
(Continued)

*Primary Examiner* — Leslie A Nicholson, III
(74) *Attorney, Agent, or Firm* — Whyte Hirschboeck Dudek S.C.

(57) ABSTRACT

A method and a device for generation formatted total packages 29 comprising a defined number of adjoining equally sized individual pieces 10 formed in particular of a food product, whereby the individual pieces 10 are transported along the conveyor lines laying on conveyor belts,
Whereby the individual pieces 10 on a first conveyor belt B1 are supplied at a mutual distance and at a speed $V_{B1}$ to a second conveyor belt B2, B3, which forms a buffer line and which adjoins the first conveyor belt B1 in transport direction, whereby the individual pieces 10 at the beginning of the second conveyor belt B2, B3 are accumulated to a buffer stack 21 of adjoining individual pieces 10, whereby the buffer stack 21 is transported on the second conveyor belt B2, B3 at the speed $V_{B2}$ which is lower than $V_{B1}$, whereby at the end of the second conveyor belt B2, B3 total packages 29 are separated from the buffer stack 21 by means of a discharging conveyor belt B4 which, during the process of separating from the buffer stack 21, has a speed $V_{B4}$ that is higher than $V_{B2}$, and whereby transitions 18, 24 are located between the conveyor belts B1, B2, B3, B4 which, during the process of accumulating and/or separating of the individual pieces 10, are displaced in relation to the transport direction A.

16 Claims, 4 Drawing Sheets

(56) References Cited

U.S. PATENT DOCUMENTS

Figure 1:
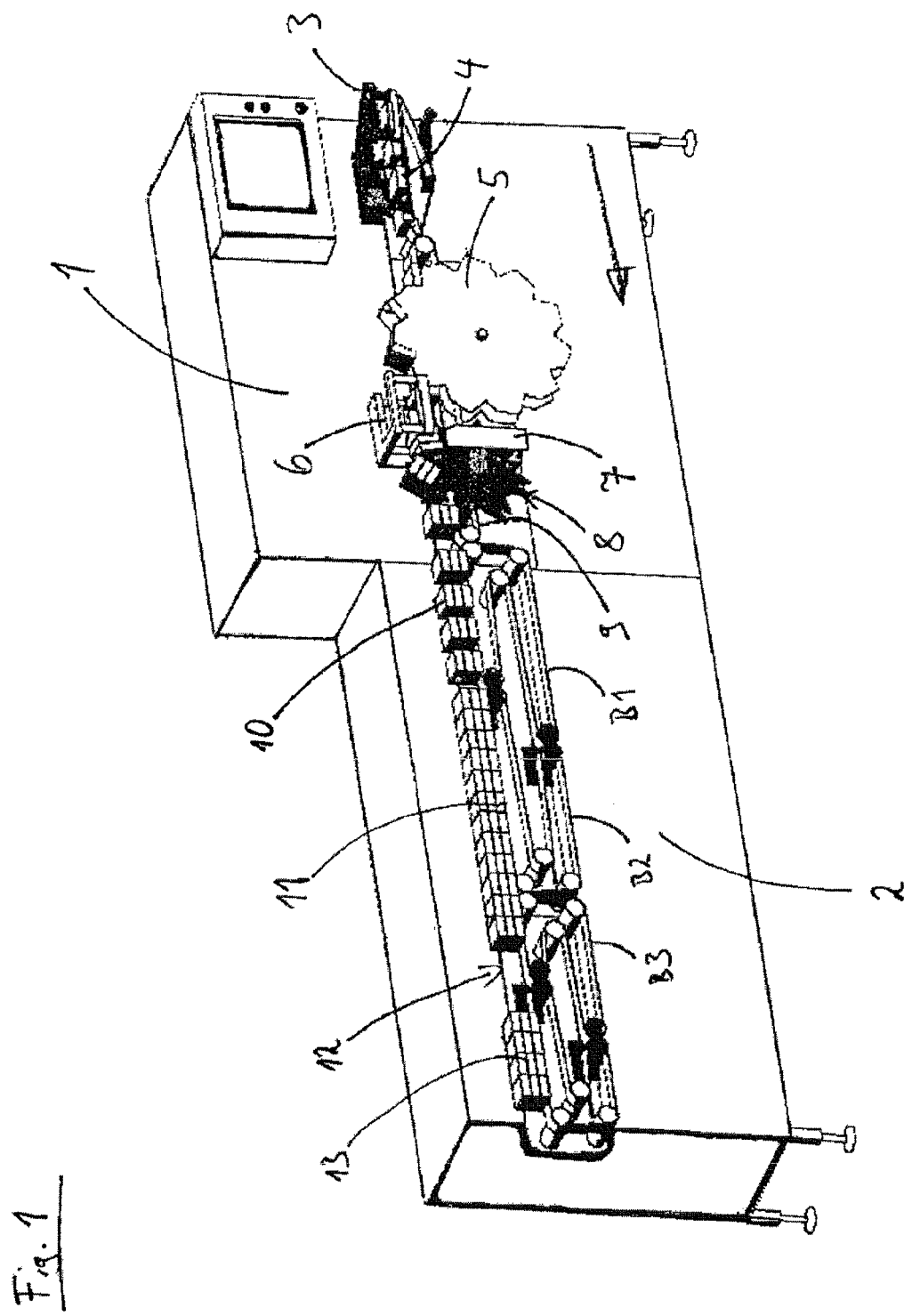

| | | | |
|---|---|---|---|
| 5,070,995 A * | 12/1991 | Schaffer et al. | 198/460.1 |
| 5,322,154 A * | 6/1994 | Lenherr | 198/460.2 |
| 5,979,634 A * | 11/1999 | Odegard et al. | 198/408 |
| 6,640,961 B2 | 11/2003 | Cavallari | |
| 6,843,362 B2 * | 1/2005 | Tachibana et al. | 198/460.1 |
| 7,063,206 B2 * | 6/2006 | Haan et al. | 198/781.05 |
| 7,542,823 B2 * | 6/2009 | Nagai | 700/230 |
| 2001/0041130 A1 | 11/2001 | Baur et al. | |
| 2002/0195315 A1 | 12/2002 | Cavallari | |

FOREIGN PATENT DOCUMENTS

| | | |
|---|---|---|
| DE | 4341044 C1 | 4/1995 |
| DE | 19801878 A1 | 8/1999 |
| EP | 1270459 A1 | 1/2003 |
| JP | S5284679 A | 7/1977 |
| JP | 03-098824 | 4/1991 |
| JP | 3211113 B2 | 9/2001 |

OTHER PUBLICATIONS

New Zealand office action dated Sep. 27, 2012 for New Zealand Patent Appln. No. 594421.

Japanese office action dated Feb. 5, 2013 for Japanese Patent Appln. No. 2011-553407.

* cited by examiner

METHOD AND DEVICE FOR PRODUCING FORMATTED PACKAGINGS

The invention concerns a method for generating formatted total packages comprising of adjoining a defined number of equally sized individual pieces formed in particular of a food product, whereby the individual pieces are transported lying on conveyor belts along the conveyor lines. Moreover, the invention concerns a device for implementing the method.

For example, the generation of such formatted total packages is known from soft cheese processing. To this end, cheese slices for industrial customers are directly placed on top of each other in product stacks and packaged in total packages comprising several product stacks. To simplify the process of taking out individual slices, the slices are sometimes stacked in the product stack in offset manner, making it easier to grab the slice. The known methods have the disadvantage that the product stacks lack flexibility with regard to their height, or rather the individual stacks forming the product stacks and thus the total package consisting of the product stacks. Consequently, the height of the individual stacks, especially the number of the superimposed slices, is depending on the respective system and can be changed only at comparatively great expense.

Generally, food processing is subject to strict hygiene regulations. Furthermore, processing has to be performed in a manner that does not impair or damage the product.

The present invention has the objective of providing a method to be realized with simple technical means and a respective device which allows generating in a hygienic and careful manner and with an adjustable format total packages of adjoining equally sized individual pieces, especially product stacks of a sliced food product, for example unpackaged slices of processed cheese, in large amounts and at high speed.

This objective is achieved by means of the method with the characterizing features of Claim 1 and by means of the device specified in Claim 10. Special embodiments are described in the respective sub-claims.

The invention is first of all based on the fundamental idea of transporting the individual pieces, especially the product stacks, successively on at least two different conveyor lines which are formed in particular by conveyor belts. Each of the conveyor lines has a special function with regard to formatting the total packages. According to the invention, the individual pieces on a first conveyor belt are supplied at a mutual distance and at a speed $V_{B1}$ to a second conveyor belt moving at a speed $V_{B2}$, which forms a buffer line and which directly adjoins the first conveyor line in transport direction. At the beginning of the second conveyor line, the individual pieces are accumulated to a buffer stack of adjoining individual pieces, whereby the buffer stack is transported on the second conveyor line at the speed $V_{B2}$ which is smaller than $V_{B1}$. The speed $V_{B2}$ can be adjusted in such a way that the distance between the individual pieces is cancelled. Using this method is especially advantageous when the individual pieces comprise respective individual stacks of a sliced food product, in particular unpackaged slices of processed cheese.

The transfer from one transport line to the next involves the problem that the individual pieces in transport direction are decelerated "at the front" by coming to rest on the second conveyor belt and, at the same time, still having "at their end" the higher speed of the first conveyor belt. This results in compression of the material which, when it involves a food product, especially cheese, causes the product to be impaired. In order to solve this problem, the invention involves the further fundamental aspect of designing the transitions between the conveyor lines along the transport direction in a displaceable manner. It is especially advantageous to implement this idea, which can be applied to any transition of the conveyor lines having these problems, when the conveyor lines are formed by conveyor belts which are redirected at the transition by means of a roller. If now during the transfer the reversing rollers disposed opposite to each other are both displaced against the transport direction, the slower conveyor belt attaches from below in a relative movement to the bottom side of the individual piece and the faster conveyor belt loses contact with the bottom side. The quicker the faster conveyor belt is removed from under the individual piece, especially the product stack, the more gently the transfer takes place. The displacement of the transitions does not change the conveyor speed of the conveyor lines, resulting in the fact that no further accelerations occur except the speed change caused by the different conveyor speeds.

When an individual piece approaches the transition, the transition is displaced against the transport direction and the individual piece is completely accepted on the second conveyor belt. When the individual piece has passed the transition, the transition is displaced at the speed $V_{B2}$ in transport direction and the distance between the individual piece and the transition remains constant. A subsequent individual piece transported on the first conveyor line at the speed $V_{B1}$ approaches at a relative speed of $V_R=V_{B1}-V_{B2}$ the displaceable transition, and thus also the previous individual piece. When the respective individual piece arrives at the displaceable transition, a new transfer cycle starts, whereby the subsequent individual piece joins up with the previous individual piece.

At the end of the second conveyor line, the total packages are separated adjustable in length from the buffer stack. The separation takes place by means of a third discharging conveyor line which has a speed $V_{B4}$ during the separating process that is higher than $V_{B2}$. Advantageously, the speed $V_{B4}$ during transition of the defined total package should correspond to the speed $V_{B2}$ in order to prevent the material from being compressed.

According to the invention, this third conveyor line should be designed in a displaceable manner. In this case, the conveyor belt forming third conveyor line can be extended with a single motion under the buffer stack until the buffer stack rests by the length of the defined total package completely on the third conveyor line. Preferably, the speed of the displacement of the transition is as high as possible in order to prevent the adjoining individual pieces from being separated and to minimize the extension within the product. Depending on the place to which the transition is displaced, a total package of any length can be separated in a gentle manner from the buffer stack.

As soon as the transition has reached the end of the total package of a defined length, i.e., the total package of a defined length rests on the third conveyor line, the separation process is initiated by increasing the speed $V_{B4}$ of the third conveyor line, separating the defined total package from the buffer stack. At the same time, the transition returns to transport direction at a speed which lies within the differential range of between $V_{B4}$ and $V_{B2}$ during the separation process, preferably to a starting position, whereupon a new separation cycle can start.

If the individual pieces are to be formed by individual stacks, the stacking can be performed by means of two upstream stacking wheels, whereby the first stacking wheel sets up the individual stacks in a continuous process while the second stacking wheel is pulse-controlled. Intrinsically, this type of stacking is independent of further processing. However, advantageously, the invention-based conveyor lines are located downstream from stacking, with the first displaceable transition forming a buffer between the first and the second conveyor line, while the second displaceable transition generates the formation of the total packages.

The function of the transport belts allows for the defined total packages to be supplied to a downstream packaging machine in a true-to-cycle and repetitive manner. This makes it possible to stack extremely pressure and friction sensitive items with the objective of subsequently forming total packages (arrangement in groups). The invention allows for high cycle times. Further advantages involve the formation of variable formats, the buffer function and the processability of individual stacks with varying dimensions without requiring the equipment to be mechanically modified. Moreover, only a minimal relative motion is generated between the transported item and the conveyor belts, reducing, for example in the case of cheese slices, the abrasion and improving the hygiene.

It is especially advantageous to use four conveyor belts with a respective length adjustable conveyor line. In this case, the equipment for multi-stack generation has four conveyor belts B1-B4 arranged in series, whereby with respect to the length of the conveyor belt the reversing roller at the end of each conveyor belt is solidly or displaceably connected with the reversing roller at the beginning of the subsequent conveyor belt. The mutually opposite displaceable reversing rollers of the different conveyor lines remain unchanged in their relative position toward each other. The end of the conveyor belt of the first conveyor line is displaceably connected with the beginning of second conveyor belt forming part of the second conveyor line. The end of the third conveyor belt forming the other part of the second conveyor line is connected with the beginning of the fourth conveyor belt forming the third conveyor line. Advantageously, the ends opposite of the connected ends of the respective conveyor belts are not adjustable. Consequently, each conveyor belt can be adjusted in length only at one end, which allows for an altogether easier control. This considerably facilitates the drive of the conveyor belts because the power transmission can take place via especially several fixed reversing rollers.

At the transition points of the length adjustable conveyor belts, as well as at the beginning and the end of the equipment, sensing means in the form of sensor have been arranged. They allow for monitoring the actual number of conveyed items. As a result, a correct arrangement in groups with minimal relative motion between the conveyor belt and the item is always guaranteed, even when prior to forming a buffer items are removed or added.

The device is able to permanently accept for a specific period of time individual pieces on belt B2 and B3 without dispensing any items via belt B4. This can be required if because of blockages the downstream station cannot accept any items but at the same time the upstream station continues to supply the equipment with items. In this case, belts B2 and B3 assume a buffer function.

Advantageously, the invention-based stacking device is used for stacking and formatting unpackaged processed cheese slices. Via a conveyor belt, open individual stacks are supplied to the stacking device at a specific speed and cycle time. In the first part of the equipment, product stacks are formed form the individual stacks. Subsequently, the product stacks are arranged into total packages, which can be transferred at a precise position of the packaging machine. The stacking device is designed in such a way that the height and the format size of the multi-stacks can be preset in a control panel, without any modifications. The entire operation can be performed form merely one control panel. All interferences and/or messages can be displayed on the panel.

Instead of previously used stacking crosses, stacking wheels are used for stacking which can move several stacks simultaneously, thus increasing the cycle time. Advantageously, sensors measure speed and distance of the supplied individual stack, allowing the speed of stacking to be adjusted to the frequency of the individual stack reaching the stacker. Especially preferred is an arrangement of two stacking wheels connected in series in which the supplied individual stacks are raised up by at least one in transport direction frontal stacking wheel, in particular turned by 90 degrees and then supplied to the contact surface attached to the at least one rear stacking wheel. When a desired number of individual stacks is situated at the contact surface, the individual piece of a defined size now formed is again turned, in particular by 90 degrees, by the at least one rear stacking wheel and supplied to the first conveyor line of the module for generating total packages.

Basically, the stacking module is able to form at high speed individual pieces consisting of any number of units. Consequently, its use is not restricted to the invention but can be used also independent from the invention-based generation of total packages.

Figure 2:
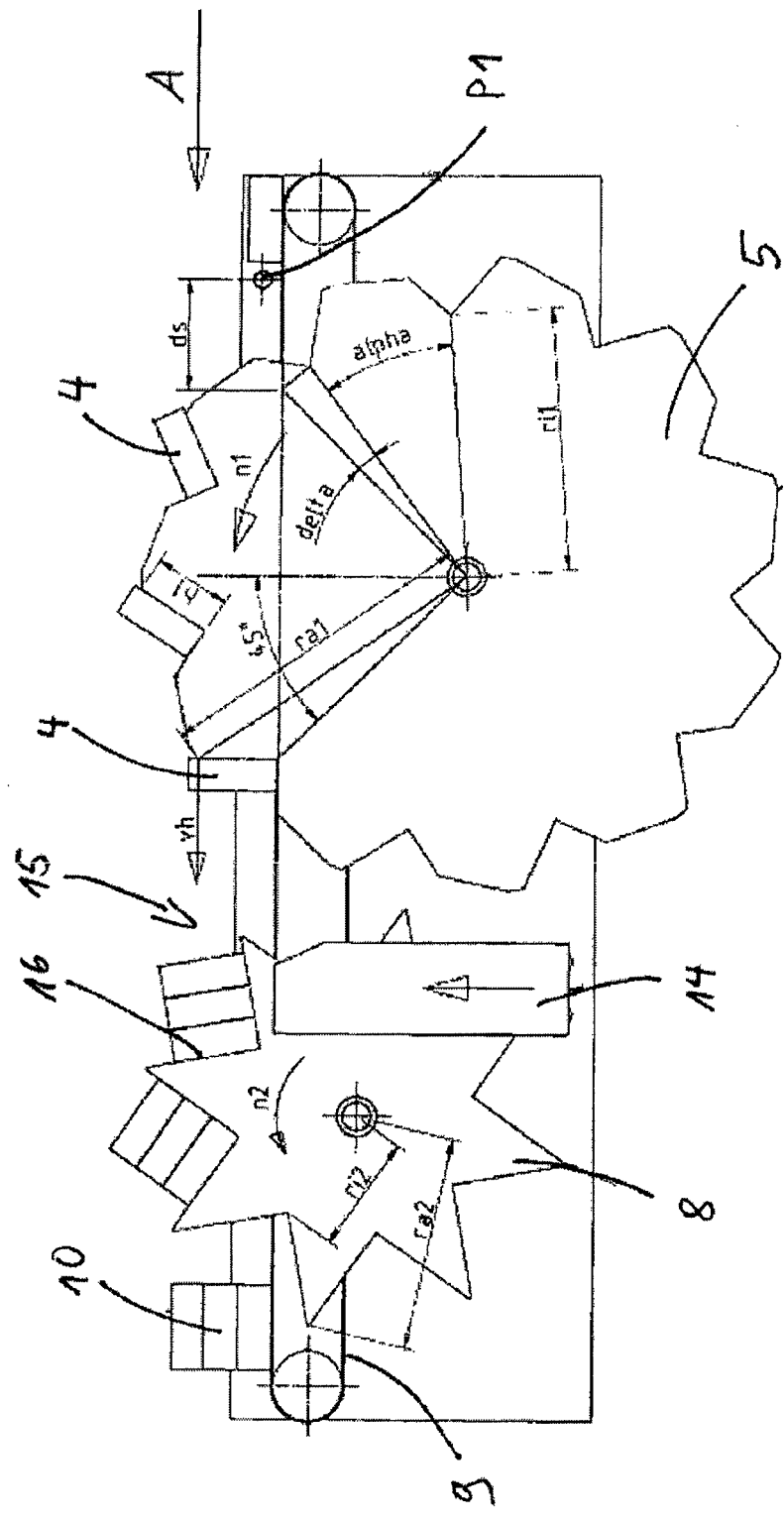
Figure 3:
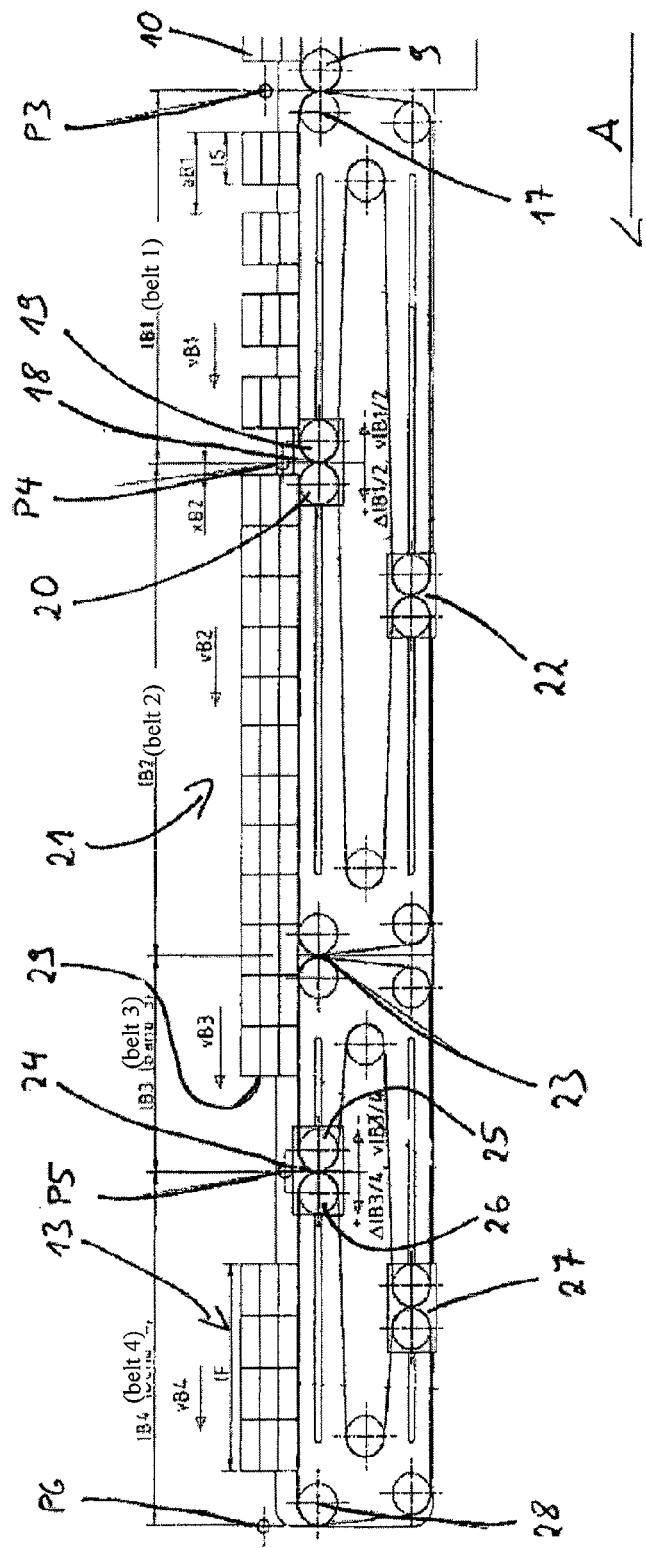

Subsequently, in FIGS. 1 to 4, an embodiment is described in more detail. It is shown:

FIG. 1: a stacking device,

FIG. 2: a detailed view of a stacking module,

FIG. 3: the module for generating total packages, and

Figure 4:
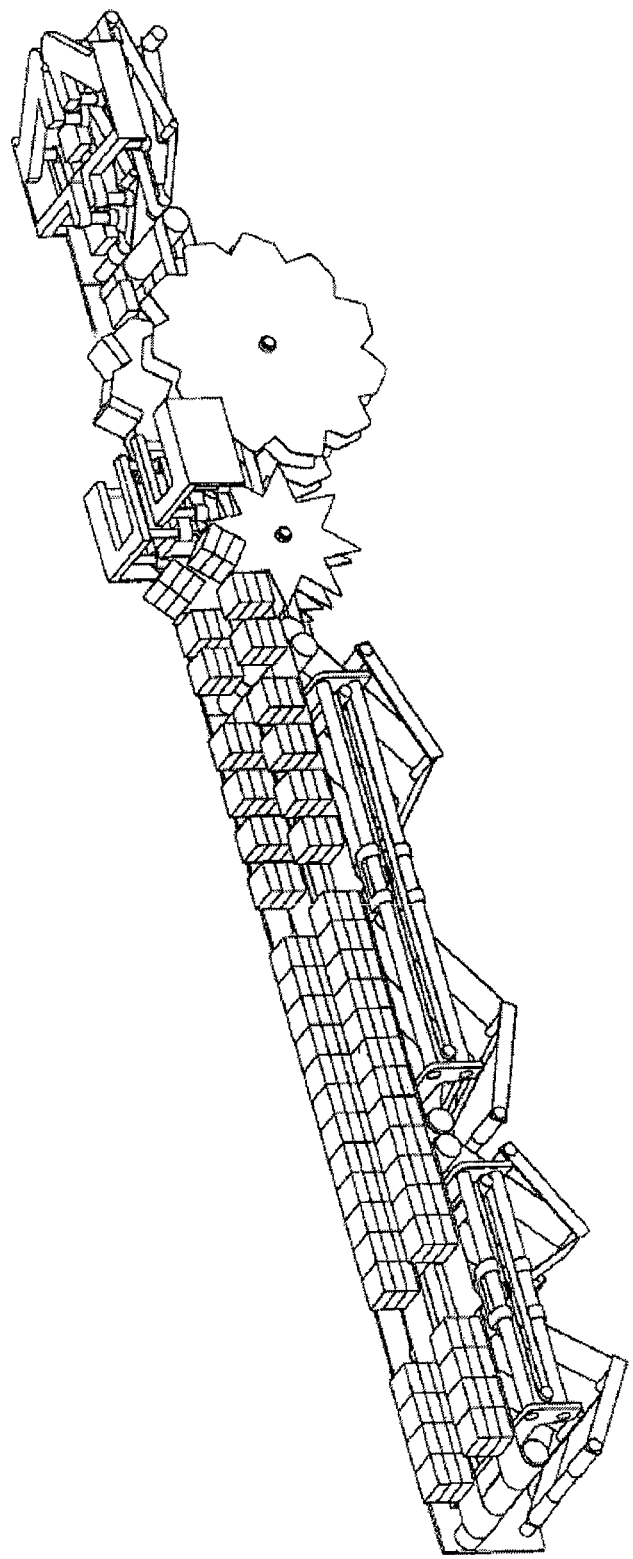

FIG. 4: two parallel stacking devices.

FIG. 1 shows a complete stacking device with a module 1 for generating stacks and a module 2 for generating total packages. At the beginning, there is an alignment station comprising a spacing control 3 which separates laying individual stacks 4. In transport direction (arrow A), the individual stacks 4 are raised up in a first stacking wheel 5 which stacks them standing in a first buffer 6. Said buffer comprises a lateral guide during multi-stack generation into a product stack. On a belt, the standing adjoining individual stacks 4 are supplied to a lifter 7 and transferred to a second stacking wheel 8 which places them on a conveyor belt 9 of the stacking module 1. A first conveyor belt B1 of the module 2 transports the product stacks which are now called individual pieces 10 separately to a second conveyor belt B2 and a third conveyor belt B3 for buffering 11 and then to a fourth conveyor belt B4 for generating total packages 12. The case shown generates a total package 13 consisting of four product stacks ("individual pieces") 10.

FIG. 2 shows a detailed view of the stacking module which is fed in transport direction (arrow A) at a speed $V_B$. Said stacking module has a first position sensor P1 which is arranged in front of the stacking wheel 5 for setting up the individual stacks 4. The stacking wheel 5 runs with a constant speed $n_1$. The detailed view includes further notations. In conveying direction behind the stacking wheel 5, the pneumatically actuated lifter 14 is shown which lifts the individual stacks 4 from conveyor belt 9 during the generation of product stacks 15. The stacking wheel 8 which turns around the product stacks has an intermittent speed $n_2$. By means of this rotational motion, the stacking wheel 8 accepts the product stacks, which in this case consist of three individual stacks 4, and places them on a surface 16. In the further course of the rotational motion, the stacking wheel 8 places the product stacks back on conveyor belt 9 where they continue to be transported as individual pieces 10.

The term "stacking wheel" in the sense of the application describes especially two parallel and synchronous identically shaped wheels each of which laterally borders the conveyor belt and both of which are basically in the shape of a toothed wheel and comprise respectively designed contact or supporting surfaces for individual stacks 4 or multi-stacks. In the course of the rotational motion the respective contact surface becomes a supporting surface.

FIG. 3 shows the module 2 for generating total packages with subsequently described notations and four conveyor belts B1-B4. At end of the belt 9 (FIG. 2), which is barely visible, an individual piece 10 is shown to be supplied. A position sensor P3 monitors the access to a first belt B1 with a solid reversing roller 17. A significant characteristic is the first displaceable transition 18 in the form of a first electromechanically displaceable adjustable slide for positioning the reversing roller 19 of belt B1 and the reversing roller of belt B2. Furthermore, the adjustable slide 18 has a position sensor P4. As a result, conveyor belts B1 and B2 comprise an adjustable conveying length and different speed for generating a buffer stack 21 from adjoining individual pieces 10. A non-actuated adjustable slide 22 has been provided as a clamping mechanism for the belts B1 and B2.

At the end of belt B2 and the beginning of belt B3 there is a fixed position 23. In addition, provision has been made for a second electromechanically displaceable adjustable slide 24, which forms the second displaceable transition 24, for positioning the reversing roller 25 of belt B2 and the reversing roller 26 of belt B3. This adjustable slide 24 also has a position sensor P5. Also in this case, a non-actuated adjustable slide 27 has been provided as a clamping mechanism for the belts B3 and B4. The end roller 28 of belt B4 is fixed. The end of the third conveyor line is monitored by a position sensor P6. On the belt B4, in front of a position sensor P6, a defined total package 13 separated from the buffer stack 21 is situated, comprising a total of four adjoining individual pieces 10. In order to facilitate an exact determination of the position of the individual pieces 10, the buffer stack 21 and the total packages 13, the position sensors are preferably placed in the center on the transitions of the individual conveyor lines, i.e., exactly between the two displaceable reversing rollers.

Subsequently, an exemplary description of the function of the stacking module 1 is provided:

Prior to a first infeed of individual stacks 4, the stacking module 1 is preferably in a starting position in which the conveyor speed $V_{BS}$ of the transitory conveyor belt 9 corresponds with the conveyor speed $V_B$ of the conveyor line supplying the individual stacks 4, thus avoiding a compression of the individual stacks 4 in the transition from the conveyor line to conveyor belt 9. The stacking wheel 5 is in rest-position and has a known output angle d. The contact surface 16 associated with the second stacking wheel 8 is aligned perpendicularly to conveyor belt 9 and the lifter 14 assumes a lower position.

The thickness of the individual stacks and the number of individual stacks per individual piece can be adjusted as parameters. The adjustments of the stacking module 1 and the module 2 generating the total packages are preferably adjusted and read via a mutual central control system.

Regarding the function of setting up the individual stacks 4 it is important that the incoming individual stack 4 reaches a contact surface of the stacking wheel 5, here a stop edge, at the moment when it is lifted through a supporting surface of the stacking wheel 5, here in the form of a supporting edge. During the process of lifting, the stacking wheel has its nominal speed $n_1$.

Afterwards, the synchronization phase of the speed of the stacking wheel 5 begins, depending on the output angle δ, the conveyor speed $V_{BS}$ and a specific distance $d_{s1}$ for the next incoming individual stack 4. The distance $d_{s1}$ is determined via the position sensor P1. A nominal distance for the distance $d_{s1}$ can be changed per offset entry in order to let the individual stack 4 arrive earlier or later, respectively.

Since the output angle δ and the conveyor speed $V_{BS}$ are constant during continuous production, synchronization depend on the point in time when the incoming individual stack 4 reaches the position sensor P1 spaced apart by $d_{s1}$.

The position of the incoming individual stack 4 is detected by means of the position sensor P1. This results in the distance of the individual stack 4 at the beginning of the synchronization phase. If the distance corresponds to the nominal distance, the stacking wheel 5 continuous to run consistently; a smaller or larger distance is adjusted by accelerating or decelerating the speed of the stacking wheel 5.

When synchronization is completed, the first individual stack 4 is accepted and the stacking process continues with a consistent speed $n_1$ at the stacking wheel 5 in order to raise up the individual stacks 4 continuously during production.

As soon as a first individual stack 4 is raised up and reaches a position sensor P2 (not shown), the time is determined until the individual stack 4 reaches the contact surface 16 associated with the stacking wheel 8. Here the determining parameters involve the conveyor speed $V_{BS}$ and the distance $d_{s2}$ determined by means of the second position sensor P2.

It is advantageous at this point to ensure again that the contact surface of the stacking wheel 2 is aligned perpendicularly to conveyor belt 9. If this is not the case, respective corrections have to be made.

When the previously determined time has expired, the first individual stack 4 has reached the contact surface 16 of the stacking wheel 8. Now the first individual stack 4 is lifted and retained by the lifter 14. This prevents the individual stack 4 from being impaired by the conveyor belt, which is otherwise dragging along below the individual pack. As soon as a second raised up individual stack 4 reaches the position sensor P2, the time is determined until this individual stack 4 adjoins the first individual stack 4. In the process, the distance $d_{s2}$ is reduced by the thickness of the already adjoining individual stacks 4.

Shortly before the second individual stack 4 reaches the lifter 14, the lifter moves down in order to be able to accept and lift also the second individual stack 4. When the previously determined time has expired, the lifter is lifted up again. This process is repeated until the second last individual stack 4 has been lifted by the lifter 14.

As soon as the last individual stack 4 of a multi-stack comes to rest at the second last individual stack 4, the previously idle stacking wheel 8 is turned by 45 degrees. For this purpose, the speed $n_2$ of the stacking wheel should be selected to be as slow as possible, in order to avoid the multi-stack from shifting on the stacking wheel. However, care has to be taken that the subsequently arriving individual stack 4 does not collide with the stacking wheel 8. This process is repeated for each following multi-stack generation 15.

At the latest after the second multi-stack is displaced, a completely formed multi-stack is placed on conveyor belt 9 with each further 45-degree rotation of the stacking wheel 8. The multi-stacks conveyed on conveyor belt 9 are the individual pieces 10 which form in the further process the defined total packages 13.

The stacking wheel 8 has to be turned by 45 degrees before the next arriving individual stack 4 has covered the distance $d_{s2}$. Depending on the different stack dimensions, it has to be examined whether or for how long in the beginning the stacking wheel 8 has to be rotated faster than the average speed $n_2$ in order to prevent a collision with the subsequently arriving individual stack 4.

Subsequently, the function of the module 2 for the total package generation is described by means of an example:

Conveyor belt B1 serves the purpose of accepting the individual piece 10 from the upstream stacking process 1 and its arrangement at a specific distance. This involves several important connections. Smaller distances between successive individual pieces 10 require lower speeds for total package generation and result in more individual pieces 10 fitting on conveyor belt B1, or in a shorter conveyor belt B1. This applies to the conveyor belt, as well as to the speed for adjusting the length.

At the beginning of total package generation, the following parameters have to be known or adjusted: the length $I_S$ of the individual pieces 10, the desired distance $a_{B1}$ of the individual pieces 10 on conveyor belt B1 and the cycle time $f_{MS1}$ of the arriving individual pieces 10.

The length $I_{B1}$ of the conveyor belt is adjusted based on the predefined length of the conveyor belt $I_{B2}$, which will be explained later. The length of the conveyor belt in the sense of this application is the variable length of the conveyor line on which an individual piece 10 is transported on the respective conveyor belt.

Infeed (Conveyor Belt B1)

By means of the known parameters $I_S$, $a_{B1}$ and $f_{MS1}$, it is possible to calculate and adjust the speed $V_{B1}$. For the individual pieces 10 to be precisely transferred to conveyor belt B1, no further arrangements have to be made. When the cycle time $f_{MS1}$ remains constant, $V_{B1}$ also remains constant and is lower than $V_{BS}$. By means of the individual pieces 10 recorded at the position sensor P3, the cycle time $f_{MS1}$ can be determined at any point in time and thus adjusted to $V_{B1}$. The transport function of conveyor belt B1 does not require any adjustment in length per se, but the stringing together of the individual pieces 10 because of changing the conveyor lines. Because of mechanically connecting the end of conveyor belt B1 with the beginning of conveyor belt B2, $I_{B1}$ is always adjusted by the same amount than $I_{B2}$. Consequently, the total of the length of conveyor belts $I_{B1}$ and $I_{B2}$ remains constant.

Buffering (Conveyor Belt B2)

On conveyor belt B2, the individual pieces 10 transferred from conveyor belt B1 are arranged to a buffer stack 21 without leaving intermediate space. Subsequently, a defined total package 13 is separated from this buffer stack 21. By generating a buffer stack 21, it is especially possible to adjust temporary variations or interferences in one of the upstream machine segments or in the downstream packaging machine.

Prior to beginning the process of generating total packages 12, the length $I_S$ of the individual pieces 10, as well as the cycle time $f_{MS4}$ of the individual pieces 10 to be transferred from conveyor belt B4 to the packaging machine has to be known or adjusted in order to determine $V_{B2}$. Normally, the following calculation applies: $f_{MS}=f_{MS1}+f_{MS2}$. The mutual length of the conveyor line of conveyor belts B2 and B3 is adjusted to a specific value, especially to a specific number of individual pieces 10 on conveyor belts B1 and B2 or the proportionate value of the total length of conveyor belt B1 and conveyor belts B2 and B3. Further parameters can especially involve a distance $X_{B2}$ from the beginning of the buffer stack 21 to the position sensor P4, the speed $V_{IB1/2}$ of the adjustable slide 18 in the direction of conveyor belt B1 when "collecting" the individual pieces 10 for buffering and the speed $V_B2$, whereby $V_{B2}$ is smaller than $V_{B1}$.

By means of the known parameters $I_S$ and $f_{MS4}$, the speed $V_{B2}$ is calculated and adjusted. As soon as an individual piece 10 reaches the position sensor 4, the conveyor line of conveyor belt B2 is extended with $V_{IB1/2}$ in the direction of conveyor belt B1 until the end of the individual piece 10 has passed the position sensor P4 by the distance $X_{B2}$. Afterwards, the length adjustment of the conveyor belt is activated synchronous to the speed $V_{B2}$ of the conveyor belt in the direction of conveyor belt B2. In this process step $V_{IB1/2}$ equals $V_{B2}$. Consequently, the distance $X_{B2}$ remains constant with $V_{B2}$, despite the movement of conveyor belt B2. The distance $X_{B2}$ guarantees that the surface of the individual piece 10 complete rests on the second conveyor belt B2 before a synchronous length adjustment of the conveyor belt takes place. Preferably, the distance corresponds to the radius of the reversing roller 20. Only when the next individual piece 1-transported on conveyor belt B1 reaches the position sensor P4, the movement of the length adjustment of the conveyor belt synchronous to $V_{B2}$ is stopped. Immediately another movement of the length adjustment of the conveyor belt in the direction of conveyor belt B1 takes place with $V_{1B1/2}$ until the end also of this individual piece 10 has passed the position sensor P4 by the distance $X_{B2}$. In this way, the individual pieces 10 are stringed together without gap one after another, thus forming the buffer stack 21. Subsequently, the length adjustment of the conveyor belt is again activated synchronously to the speed $V_{B2}$ of the conveyor belt in the direction of conveyor belt B2 and the speeds $V_{IB1/2}$ and $V_{B2}$ are again equal.

If the frequencies $f_{MS1}$ and $f_{MS4}$ are equal, the length of conveyor band $I_{B2}$ varies at most by the stacking length $I_S$ and the buffer generated by means of the buffer stack 21 remains basically constant (=normal case). If $f_{MS1}$ exceeds $f_{MS4}$, the length $I_{B2}$ and $I_{B3}$ of the conveyor line increases gradually and the buffer is filled (for example, in case of interferences in the packaging machine). If frequency $f_{MS1}$ is lower than $f_{MS4}$, the length $I_{B2}$ and $I_{B3}$ of the conveyor line decreases gradually and the buffer is emptied (for example, in case of interferences in front of conveyor belt B1).

The speed of the length adjustment $V_{IB1/2}$ of the conveyor belt in the direction of conveyor belt B1 is a parameter that can be freely preset. This value is able to affect a slip between conveyor belt B1 and the individual piece 10 when impacting the previous individual piece 10. The higher $V_{IB1/2}$ the smaller the slip will be and the less the individual pieces are compressed. The lower $V_{IB1/2}$ the larger the slip will be and the more the individual pieces are compressed. If $V_{IB1/2}$ corresponds to $V_{IB1/2max}$, gaps are generated between the individual pieces 10 during the process of forming a buffer.

The difference in speed between $V_{B1}$ of the first conveyor belt 1 and $V_{IB1/2}$ of the adjustable slide 18 existing during the transfer of the individual piece 10 serves especially the purpose of preventing the surface of the individual piece from being impaired. Preferably, the difference in speed is to be selected in such a way that an adherence of the individual piece 10 to conveyor belt B1 is overcome by the inertia of the individual piece 10 during the process of passing the reversing roller 19.

Generation of Total Packages (Conveyor Belt B3) and Transfer of the Total Packages (Conveyor Belt B4)

The total package generation 12 with subsequent transfer requires a close interaction between conveyor belt B3 and conveyor belt B4. Conveyor belt B# accepts the individual pieces 10 as they are supplied by conveyor belt B2, resulting in a consistent buffer stack 21. The total packages 13 are generated by means of different speeds $V_{B3}$ and $V_{B4}$ of conveyor belts B3 and B4, including the adjustment of the conveying length between the two conveyor belts. During the process of transferring the defined total packages 13, the speeds of conveyor belts B2 and B3 are equal, thus preventing the buffer stacks 21 from disconnecting or compressing.

Prior to generating the total packages 12, the length $I_{B3}$ of the conveyor line is adjusted to the initial value $I_{B3(0)}$ in such a way that the potential travel distance $\Delta I_{B3/4}$ in the direction of conveyor belt B3 amounts to slightly more than the length $I_F$ of the defined total package 13. Conveyor belt B4 runs at a speed of $V_{B4}$ corresponding to $V_{B3}$. This applies only in the event that no total package 13 is situated on conveyor belt B4, otherwise $V_{B4}$ has the value zero.

The following parameters have to be known or adjusted: the length $I_S$ of the individual pieces 10, the length of the total packages $I_F$, calculated from the number of individual pieces 10 per total package 13 and the speed of the conveyor belt $V_{B3}=V_{B2}$. As described above, $V_{B4}$ should equal $V_{B3}$ during total package generation.

The length $I_{B3}$ of the conveyor belt remains unchanged on $I_{B3(0)}$ until the first individual piece 10 has reached the position sensor P5. At the latest at this point in time a total package 13 possibly situated on conveyor belt B4 has to be transferred to the downstream packaging machine and the speed $V_{B4}$ of the conveyor belt should correspond again to $V_{B3}$ and $V_{B2}$.

As soon as the first individual piece 10 reaches the position sensor P5, conveyor belt B3 is extended as quickly as possible with $V_{IB3/4}$ in the direction of conveyor belt B3 until by way of calculation the end of the defined total package 13 has reached the position sensor P5, i.e., the transition 24 is located exactly at the interface between the defined total package 13 and the remaining buffer stack 21. In this respect, the same principles apply that were described above with regard to speed $V_{IB1/2}$. Subsequently, conveyor belt B4 is instantly accelerated to a speed $V_{B4}$ which basically exceeds $V_{B3}$. The length adjustment of the conveyor belt is activated with $V_{B4}=V_{IB3/4}=V_{B3}$ in the direction of conveyor belt B4 until $I_{B3}$ has returned to the adjusted initial value $I_{B3(0)}$. The speed $V_{B3}$ corresponds here permanently to $V_{B2}$.

As a result, the defined total package 13 is separated from the remaining buffer stack 21 and can be moved on conveyor belt B4 independent of conveyor belt B3. Because of the returning length adjustment of the conveyor belt, a distance is formed in transport direction A between a front end 29 of the buffer stack 21 and the position sensor P5. As soon as the defined total package 13 reaches the position sensor P6, conveyor belt B4 is stopped. Only when the downstream packaging machine is ready to accept the total package 13, the defined total package 13 is transferred. Here, $V_{B4}$ of the transport speed should correspond to the packaging machine in order to prevent the surface of the total package 13 from being compressed or stretched during the transfer process.

This transfer has to be completed at the latest when the buffer stack 21 has again reached the position sensor P5. If the defined total package 13 has not been transferred at this point in time, conveyor belts B3 and B2 have to be stopped and the buffer has to be increased.

The higher the selected speeds $V_{IB3/4}$ and $V_{B4}$ the more time remains for the defined total packages 13 to be transferred in true-to-cycle and repetitive manner to the packaging machine.

A further idea of the invention involves arranging tow such stackers in parallel fashion next to each other. Such parallel guidance is shown in FIG. 4. With such a device, it is basically possible to generate from solid products with a wide range any product stacks if the parallel stackers are differently loaded and controlled. In the end, the stacks are combined for the final product. This allows for great variability with regard to the height of the product stacks.

The invention claimed is:

1. A method for generating formatted total packages comprising a defined number of adjoining equally sized individual pieces of a food product, whereby the individual pieces are transported along conveyor lines laying on conveyor belts, characterized in that the individual pieces on a first conveyor belt (B1) are supplied at a mutual distance and at a speed $V_{B1}$ to a second conveyor belt (B2, B3), which forms a buffer line and which adjoins the first conveyor belt (B1) in a transport direction, such that the individual pieces at a first end of the second conveyor belt (B2, B3) are accumulated to form a buffer stack of adjoining individual pieces, whereby the buffer stack is transported on the second conveyor belt (B2, B3) at a speed $V_{B2}$ which is lower than speed $V_{B1}$, and at a second end of the second conveyor belt (B2, B3), a plurality of total packages are separated from the buffer stack by means of a discharging conveyor belt (B4) which, during the separating of said plurality of total packages from the buffer stack, has a speed $V_{B4}$ that is higher than the speed $V_{B2}$, and transitions are located between the conveyor belts (B1, B2, B3, B4), which, are displaced in relation to the transport direction during the accumulating of the individual pieces to form the buffer stack, the separating of the total packages from the buffer stack, or both.

2. A method according to claim 1, characterized in that the transitions between the conveyor belts (B1, B2, B3, B4) comprise, at an end, reversing rollers which are synchronously displaced in relation to the transport direction to change a length of the conveyor lines of the conveyor belts involved in such displacement.

3. A method according to claim 1, characterized in that each individual piece comprises a product stack of a food product, which is sliced and attached to the conveyor belt.

4. A method according to claim 1, characterized in that prior to reaching the first conveyor belt (B1), the individual pieces are pieced together from individual stacks by means of a stacking unit.

5. A method according to claim 1, characterized in that when accumulating the individual pieces to form the buffer stack, a first displaceable transition is displaced opposite to the transport direction until an individual piece has passed the first displaceable transition, that the first displaceable transition is subsequently displaced in the transport direction until an individual piece that is transported on the first conveyor belt (B1) has reached the first displaceable transition, whereby during the displacement in the transport direction, a speed of the displacement (vIB1/2) of the first displaceable transition equals the speed $V_{B2}$ of the buffer stack.

6. A method according to claim 1, characterized in that in order to separate a defined total package from the buffer stack, a second displaceable transition is displaced opposite to the transport direction until the defined total package has passed the second displaceable transition, that the second displaceable transition is subsequently displaced in the transport direction as soon as the defined total package of a defined size has passed the second displaceable transition.

7. A method according to claim 6, characterized in that after the defined total package has been separated, the second displaceable transition returns to an initial position.

8. A method according to claim 1, characterized in that the individual pieces are formed by several individual stacks, whereby the individual stacks arriving in a laying position are raised up by a first stacking wheel which picks up an arriving individual stack, and the raised up individual stacks are accumulated to form an individual piece and the individual pieces are turned into a laying position by a second stacking wheel.

9. A method according to claim 8, characterized in that a speed (n1) of the first stacking wheel is synchronized with the distance of the individual stack arriving on a conveyor belt and that the second stacking wheel has an intermittent speed (n2).

10. A device for generating formatted total packages, by the method according to claim 1, which device comprises the first conveyor belt (B1) for conveying the individual pieces of food products and the second conveyor belt (B2, B3) in a transport direction, whereby a first transition is situated between the first (B1) conveyor belt and the second (B2, B3) conveyor belt, characterized in that
the first transition can be displaced in relation to the transport direction, whereby the displacement changes the lengths of the conveyor lines of the first (B1) conveyor belt and the second (B2, B3) conveyor belt.

11. A device according to claim 10, characterized by means for displacing the transition opposite to the transport direction when an individual piece passes the first transition, and for displacing the transition in the transport direction until a subsequent individual piece reaches the first transition.

12. A device according to claim 10, characterized by the discharging conveyor belt (B4) following the second conveyor belt (B2, B3) being in transport direction, whereby a second displaceable transition to separate the total packages is situated between the second conveyor belt (B2, B3) and the discharging conveyor belt (B4).

13. A device according to claim 12, characterized by sensors to detect the position of the individual piece at the first transition and the second displaceable transition.

14. A device according to claim 12, characterized in that the first transition and the second displaceable transition are formed by an electromechanically displaceable adjustable slide which connects two reversing rollers which are arranged in parallel and at the end of the respective conveyor belts (B1, B2, B3, B4).

15. A device according to claim 10, characterized in that the second conveyor belt (B2, B3) comprises two belts connected to each other by means of a fixed transition.

16. A device for generating formatted total packages comprising a defined number of adjoining equally sized individual pieces of a food product, whereby the individual pieces are transported along conveyor lines laying on conveyor belts, the device comprising:
a first conveyor belt (B1) for supplying the individual pieces to a second conveyor belt (B2, B3), which forms a buffer line and adjoins the first conveyor belt (B1) in a transport direction;
a discharging conveyor belt (B4) at a second end of the second conveyor belt (B2, B3);
a control unit configured for operating
(i) the first conveyor belt (B1) at a speed $V_{B1}$ to the second conveyor belt (B2, B3), such that the individual pieces on the first conveyor belt (B1) are supplied at a mutual distance;
(ii) the second conveyor belt (B2, B3) at a speed $V_{B2}$ which is lower than speed $V_{B1}$, such that the individual pieces are accumulated to form a buffer stack of adjoining individual pieces at a first end of the second conveyor belt (B2, B3); and
(iii) the discharging conveyor belt (B4) at a speed $V_{B4}$ that is higher than the speed $V_{B2}$, such that a plurality of total packages are separated from the buffer stack at a second end of the second conveyor belt (B2, B3); and
transitions between the conveyor belts (B1, B2, B3, B4), which are displaced in relation to the transport direction during the accumulating of the individual pieces to form the buffer stack, the separating of the total packages from the buffer stack, or both.

* * * * *

UNITED STATES PATENT AND TRADEMARK OFFICE
CERTIFICATE OF CORRECTION

PATENT NO. : 8,596,446 B2
APPLICATION NO. : 13/203553
DATED : December 3, 2013
INVENTOR(S) : Andreas Biggel and Stefan Hofer Page 1 of 1

It is certified that error appears in the above-identified patent and that said Letters Patent is hereby corrected as shown below:

Title Page, item [30] Foreign Application Priority Data:
Column 1 replace "Mar. 4, 2009" with --May 4, 2009--

Signed and Sealed this
Third Day of March, 2015

Michelle K. Lee
*Deputy Director of the United States Patent and Trademark Office*